Jan. 30, 1968 L. G. SPRAKER 3,366,941
STABLE FREQUENCY TRANSMITTING DEVICE
Filed Feb. 19, 1965

Inventor:
Leon G. Spraker,
by Paul A. Frank
His Attorney.

United States Patent Office 3,366,941
Patented Jan. 30, 1968

3,366,941
STABLE FREQUENCY TRANSMITTING DEVICE
Leon G. Spraker, Canajoharie, N.Y., assignor to General Electric Company, a corporation of New York
Filed Feb. 19, 1965, Ser. No. 433,868
4 Claims. (Cl. 340—177)

ABSTRACT OF THE DISCLOSURE

A stable frequency data transmitting device employing two oscillating electrical circuits, one of which generates a high frequency signal responsive to the data received and the other of which generates a fixed low frequency signal. The two signals combine to form an intermediate frequency signal proportional to the data received to indicate the value of the data transmitted. Effects extraneous to the desired data are compensated for by the two circuits and therefore do not affect the final output.

My invention relates to transmitter, and more particularly to a transmitting circuit which transmits data by radio frequency signals to a receiver unconnected to the transmitter.

In the operation of moving equipment, including rotating shafts, vibrating platforms and other structures which have substantial motion during operation, apparatus is needed that can measure deviations from the proper operation of the equipment without interfering with this operation. Presently, to measure deflections in the orientation of rotating shafts, commutators, are employed that transmit the data by means of a structural connection to the reading instrument. Commutators and other direct connection transmitting devices, even though frictional forces are substantially reduced, still have a decided effect on the operation of the device being measured and thus alter the measurement reading received. This, besides the fact that substantial wear is still present in any direct connection indicating means; leads to the desire for an indicating device that avoids the direct structural connection aspect inherent in those devices that are presently employed. Also in the medical field the need arises for a measuring device that is placed within the human body and that transmits its message to a receiver outside the body without any material or structural connection therebetween. The same principle of transmission of data without any connection, especially one having an electrical wiring connection therebetween would be extremely useful in transmission of a multitude of different measurements where there is a decided advantage in not having a structural connection between the transmitter and the receiver. The need then arises for a device that transmits data to a receiver without any material or structural connection therebetween; an electrical data transmitting means that compensates for any extraneous effects, such as temperature, not related to the measurement being taken.

My invention contemplates a transmitting device that sends data from a source to a receiving unit without having any structural connection therebetween and at the same time compensates for any phenomena unrelated to this data so as not to have the reading of the receiving unit affected thereby.

The chief object of my invention is the provision of an improved data transmitting device that transmits data by electromagnetic waves, and also compensates for effects unrelated to this data being transmitted.

Another object of my invention is the provision of an electrical data transmitting device that transmits data via radio frequency signals to a radio frequency receiver without there being any structural connection therebetween, and also takes into consideration effects, such as temperature unrelated to the transmitted data so these effects do not influence the data signals received by the receiver.

These and other objects of my invention will be more readily perceived from the description which follows.

In carrying out the objects of my invention, I provide a highly efficient data transmitting device employing two oscillating electrical circuits, one of which generates a high frequency signal responsive to the data received and the other of which generates a fixed low frequency signal. The two signals then combine to form an intermediate frequency signal proportional to the data received, which signal is easily picked up by a radio frequency receiver to indicate the value of the data transmitted. Any effects extraneous to the desired data are compensated for by the two circuits and therefore do not affect the final output reading.

The attached drawing indicates preferred embodiments of my invention in which.

Figure 1:
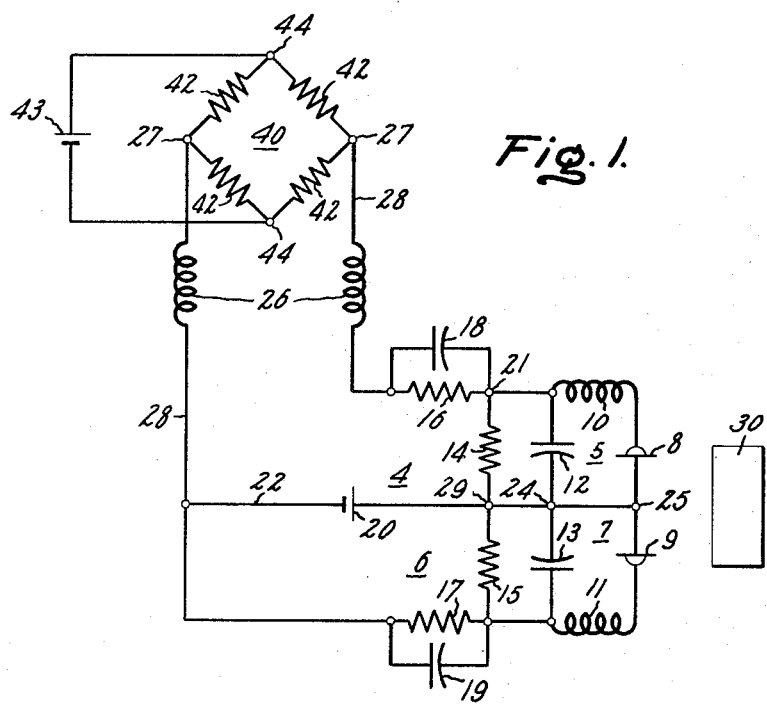
FIGURE 1 is a schematic diagram of the circuit of my invention.

In FIGURE 1 there is shown a schematic diagram of the electrical transmitting circuit of my invention including the data gathering means. The construction includes a basic transmitting circuit comprising data responsive circuit 4 and reference circuit 6. The former, circuit 4, contains an oscillating source 8, which as indicated in FIGURE 1 is preferably a tunnel diode. To properly stabilize the oscillations of diode 8 and keep them within easily readable values, inductor 10 is positioned in series therewith. Inductor 10 comprises a wound coil of electrically conductive material, a rod of flat strip steel or other suitable inductive device. Capacitor 12, positioned in parallel with the series combination of diode 8 and inductor 10, properly contains the oscillations of diode 8 within circuit 5 (consisting of diode 8, inductor 10 and capacitor 12), and thereby prevents these oscillations from travelling throughout the remainder of data responsive circuit 4 and interfering with its proper operation. If capacitor 12 were not present in circuit 5 the oscillations transmitted therefrom would be influenced by the other elements included in circuit 4, possibly including even data gathering source 40. Capacitor 12 then effectively contains the oscillations of circuit 5 for proper operation of my transmitter. Resistors 14 and 16 which have common juncture at point 21 serve as bias resistors to keep the operation of tunnel diode 8 within the negative resistance part of the standard tunnel diode characteristics to insure proper oscillation of circuit 4. As an additional element, filter capacitor 18 may be connected in parallel with resistor 16 to produce a low impedance path for the electric current during initial operation, depending on the characteristics of the tunnel diode being employed. It is noted that data responsive circuit 4 (including circuit 5) is preferably a high frequency generating circuit in comparison to circuit 6, as will be described. By the use of a high frequency circuit, small changes in the data being transmitted are effective to yield large frequency changes in circuit 5, for more accurate output readings.

Circuit 6, the fixed reference part of my transmitting circuit is interconnected with circuit 4 and as shown in FIGURE 1 is a mirror image thereof. Included within circuit 6 is oscillating circuit 7, consisting of oscillating means 9, which as in circuit 5 is preferably a tunnel diode, in combination with inductor 11 which function together in the same manner as similar elements 8 and 10 in circuit 5. Circuit 7, is preferably a low frequency circuit so that since circuit 4 is a high frequency circuit and the data is an input thereto, the difference reading between the two circuits 4 and 6 is more pronounced for more accurate output readings. Resistors 15 and 17 and capacitors 19 and 13 also function in the same manner as their counterparts, 14, 16 and 18 and 12 in circuit 4. A voltage source, for example battery 20, is positioned in leg 22 common to both circuits 4 and 6 so that an identical voltage is thereby impressed across circuits 4 and 6 to insure uniform initial response thereof and especially of oscillating circuits 5 and 7. Center leg 22 also serves to interconnect circuits 4 and 6 by interconnecting resistors 14 and 15 at point 29, capacitors 12 and 13 at point 24 and tunnel diodes 8 and 9 at point 25 to thus properly complete the circuit.

The data desired to be transmitted is supplied to circuit 4 across terminals 27. Connected in series between circuit 4 and terminals 27 are inductors 26, one in each line 28 leading to input terminals 27. Inductors 26 serve as choke filters to prevent unwanted radio frequency signals from interfering with the operation of oscillating circuits 5 and 7, and thereby the proper operation of my device.

In operation, both circuits 5 and 7 containing tunnel diodes 8 and 9, respectively, produce radio frequency oscillation signals; responsive circuit 5 preferably producing a high frequency signal, and fixed circuit 7 preferably producing a lower frequency signal. The two signals are combined to form an intermediate frequency signal which is received by a standard radio frequency receiver 30 (such as a frequency modulated receiver) having a suitable output indicating device. The input signal from data source 40 is impressed across terminals 27 to alter the frequency of the oscillations of circuit 5, which combined with the substantially constant frequency signal emitted by circuit 7 produces an intermediate signal varying in frequency with the data signal across terminal 27. Thus, this new signal transmitted to receiver 30 is a direct indication of the data being fed into terminals 27. It will be appreciated that receiver 30 has no structural connection to any of the other elements of my device and therefore can be placed without regard to their location; with the only requirement being that the distance that receiver 30 is placed away from the transmitter be within the range of the generated radio frequency signals for accurate reception thereof.

During operation of my transmitter, circuit 6 serves the particularly desirable function of compensating for any extraneous effects on responsive circuit 4. For example, temperature effects, field inductance due to machinery parts, voltage flunctuations, body capacitance of the user and many other phenomenon, unrelated to the measurement desired, have the same effect on both circuits 4 and 6 and therefore have no effect on the final output reading as indicated by receiver 30. Thus an increase in temperature surrounding both circuits will not show up in the output reading, as it affects both circuits 4 and 6 in the same manner to thereby cancel out its effect. The output oscillation then is uninfluenced by the effect of temperature or other atmospheric effects surrounding transmitter 2.

It is noted that series resistors 14 and 16, capacitor 18 and inductors 26 are not essential to operation, and may be removed as with the equivalent elements of circuit 6, but of course with a corresponding decrease in accuracy even though operation is still possible. Equivalent elements which serve the same functions may, of course, also be provided in place of the circuit elements shown.

The data transmitted to circuit 4 through terminals 27 may constitute many different inputs. A preferred one is strain data, measured by a strain gage Wheatstone bridge circuit as shown in FIGURE 1. In this circuit 40 four strain responsive resistors 42 such as silicone strain gages or Nichrome foil are connected, one respectively in each arm, so that two have a common juncture with one terminal 27 and two with the other to form a balanced bridge. A voltage is then impressed across terminals 44, where one of each set of two resistors 42 join in standard Wheatstone bridge strain gage fashion. Resistors 42 are supported on a part to be measured and a difference in strain produces a difference in resistance value, and thus an imbalance in bridge 40. This imbalance is transmitted as an input voltage signal to terminals 27 to thereby change the frequency of oscillations emitted by circuit 4 and received by receiver 30, as aforementioned.

Broadly, anything that produces a voltage impulse across terminals 27 can be transmitted as a radio frequency signal by circuit 4 to be received by receiver 30. Other transmittable data would include the human functions such as pulse rate, heart beat, temperature, optical phenomena including visible light, and of course, sound and pressure. The data collectors vary with the data being collected, for example, pulse and heart beat preferably employ transducers in place of the resistors 42 shown with the strain gage of FIGURE 1, sound collection employs microphones and light employs light solar, or photo cells. It will be appreciated that four strain gages 42 are needed for proper operation of the bridge circuit, but for various other sources one is sufficient, for example, only one photo cell is needed for light measurement.

It is further noted that as aforementioned, my transmitter becomes extremely useful in the medical arts, where it may be placed within the human body and be capable of transmitting data to a receiver outside the human body without any connection between the receiver and transmitter.

Figure 2:
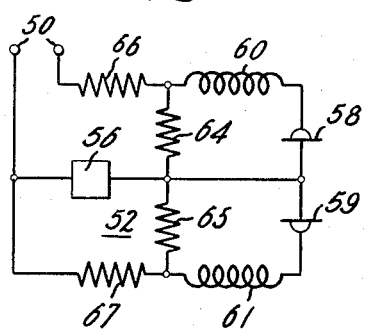
FIGURE 2 is a schematic diagram of a modified form of circuit of FIGURE 1.

FIGURE 2 illustrates the circuit of FIGURE 1 wherein, as aforementioned, the circuit is operative with certain elements removed. The transmitter includes tunnel diode 58 and inductor 60 operating as the oscillating circuit; parallel resistor 64 and series resistor 66 which are operative as aforementioned; and reference circuit 52 containing corresponding elements (diode 59, inductor 61 and resistors 65 and 67). In this circuit a source of voltage 56 is impressed across both parts of the circuit as in FIGURE 1 and the input reading is supplied through leads 50. Voltage source 56, which in this mode is a thermocouple, may also be a battery or other voltage source as with the mode described in FIGURE 1. Operation is in the same manner as the mode of FIGURE 1 but with accuracy somewhat reduced.

It is apparent from the foregoing that my invention attains the objectives set forth. Apparatus embodying my invention is sturdy in construction and well adapted for use in conjunction with various environments. Transmission of data is accomplished accurately and in a highly efficient manner without the need for a structural link between the transmitting means and the receiving unit.

Specific embodiments of my invention have been described, but the invention is not limited thereto since many modifications may be made by one skilled in the art and the appended claims are intended to cover all such modifications as fall within the true spirit and scope of my invention.

What I claim as new and desire to secure by Letters Patent of the United States is:

1. A telemetering transmitter comprising
   two oscillators comprising each a tunnel diode in a series tuned circuit, one of said oscillators being tuned to a higher frequency than the other,
   a voltage source energizing both of said oscillators in a like manner,
   a circuit having a transducer means for generating a variable voltage, said circuit being in series with said first voltage source as to one of said oscillators whereby said oscillators beat against each other and produce a beat frequency which is a function of said variable voltage and independent of extraneous effects which affect said oscillators.

2. A telemetering transmitter as set forth in claim 1 in which said transducer means is a strain guage Wheatstone bridge having a voltage source across two opposed terminals and the remaining two terminals being connected in series with said first voltage source as to one of said oscillators.

3. A telemetering transmitter as set forth in claim 1 in which a resistor and capacitor connected in parallel are connected in series between each said oscillator and its voltage source.

4. A telemetering transmitting and receiving device comprising
   a data transmitter including
   two oscillators comprising each a tunnel diode in a series tuned circuit, one of said oscillators being tuned to a higher frequency than the other,
   a voltage source energizing both of said oscillators in a like manner,
   a circuit having a transducer means in it for generating a variable voltage and being in series with said first voltage source as to one of said oscillators whereby said oscillators beat against each other and produce a beat frequency which is a function of the said variable voltage and independent of extraneous effects which affect said oscillators, and
   receiver means for receiving a combined frequency output from said two oscillators indicative of the data being transmitted.

References Cited
UNITED STATES PATENTS

| | | | |
|---|---|---|---|
| 3,065,432 | 11/1962 | Duncan | 331—107 |
| 3,156,910 | 11/1964 | Tarbutton | 340—177 |
| 3,212,027 | 10/1965 | Ko | 331—107 |
| 3,257,623 | 6/1966 | See | 331—40 |

THOMAS B. HABECKER, *Primary Examiner.*